(12) United States Patent
Fackler

(10) Patent No.: US 8,746,641 B2
(45) Date of Patent: Jun. 10, 2014

(54) LATCHING MOUNTING ASSEMBLY

(71) Applicant: Andrew Wireless Systems GmbH, Buchdorf (DE)

(72) Inventor: Karl-Heinz Fackler, Wemding (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days.

(21) Appl. No.: 13/834,003

(22) Filed: Mar. 15, 2013

(65) Prior Publication Data

US 2013/0256477 A1    Oct. 3, 2013

Related U.S. Application Data

(60) Provisional application No. 61/686,019, filed on Mar. 29, 2012.

(51) Int. Cl.
*E04G 3/00* (2006.01)

(52) U.S. Cl.
USPC ............ 248/292.12; 248/292.13; 248/297.31; 248/299.1; 343/882; 343/892

(58) Field of Classification Search
USPC ................ 248/218.4, 219.4, 292.12, 292.13, 248/292.14, 297.31, 299.1; 343/890, 892, 343/898
See application file for complete search history.

(56) References Cited

U.S. PATENT DOCUMENTS

| | | | |
|---|---|---|---|
| 473,919 A * | 5/1892 | Edsall | 248/292.12 |
| 1,546,739 A * | 7/1925 | Le Lande | 248/292.12 |
| 3,026,079 A * | 3/1962 | Stack | 248/122.1 |
| 4,807,935 A * | 2/1989 | King | 297/411.38 |
| 5,751,548 A | 5/1998 | Hall et al. | |
| 5,823,487 A * | 10/1998 | Kirchhoff et al. | 248/118 |
| 6,232,928 B1 * | 5/2001 | Zimmerman et al. | 343/882 |
| 6,264,152 B1 | 7/2001 | Bloch et al. | |
| 6,354,552 B1 | 3/2002 | Chiu | |
| 7,490,807 B2 * | 2/2009 | Souza et al. | 248/372.1 |
| 2009/0314912 A1 * | 12/2009 | Whitley et al. | 248/299.1 |

FOREIGN PATENT DOCUMENTS

| | | |
|---|---|---|
| CH | 510337 | 7/1971 |
| JP | 2000179538 | 6/2000 |
| WO | 2007024175 A1 | 3/2007 |
| WO | 2007068131 A1 | 6/2007 |

OTHER PUBLICATIONS

International Patent Application No. PCT/IB2013/052104, International Search Report and Written Opinion mailed Aug. 8, 2013 (11 pages).

* cited by examiner

*Primary Examiner* — Gwendolyn Baxter
(74) *Attorney, Agent, or Firm* — Kilpatrick Townsend & Stockton LLP

(57) ABSTRACT

Certain aspects are directed to a mounting assembly for mounting an antenna unit or other device. The mounting assembly includes at least one bracket and at least one retaining assembly. The bracket can be movably positioned at multiple orientation angles with respect to a surface. The bracket includes a latching edge that defines multiple recesses. Each of the recesses corresponds to one of the orientation angles. The retaining assembly is positioned adjacent to the bracket. The retaining assembly includes at least one protrusion that can engage one of the recesses to form a latching connection between the bracket and the retaining assembly. The latching connection can retain the bracket at an orientation angle corresponding to the engaged recess.

17 Claims, 17 Drawing Sheets

LATCHING MOUNTING ASSEMBLY

CROSS-REFERENCE TO RELATED APPLICATIONS

This application claims priority to U.S. Provisional Application Ser. No. 61/686,019 filed Mar. 29, 2012 and titled "Latching Mounting Assembly," the contents of which are hereby incorporated by reference.

TECHNICAL FIELD

The present invention relates generally to telecommunications equipment and more particularly (although not necessarily exclusively) to a latching mounting assembly for mounting antennas or other telecommunication devices.

BACKGROUND

A telecommunication system may include antenna units and other devices that are positioned in various physical locations throughout a geographical area serviced by the telecommunication system. Antenna units and other devices may be affixed to structures or objects in various locations via mounting assemblies. For example, a mounting assembly may be used to attach an antenna unit to a wall or pole and to orient the antenna unit at a fixed angle to provide signal coverage. Reconfiguring the telecommunication system to improve or otherwise modify signal coverage may involve reconfiguring the mounting assembly such that the antenna unit is oriented at a different angle.

Mounting antenna devices or other equipment may involve multiple tools for adjusting an orientation angle of the mounting assembly and/or removing screws or other fastening devices in order to adjust the orientation of the mounting assembly. The use of multiple tools and/or the removal of fastening devices may increase the complexity of adjusting the orientation angle and may increase the likelihood that such tools and fastening devices are inadvertently lost when adjusting the orientation angle.

Apparatuses and systems are desirable for simplifying the process of adjusting the orientation of a mounted device.

SUMMARY

Certain aspects and features of the present invention are directed to a latching mounting assembly.

In one aspect, a mounting assembly for mounting a device is provided. The mounting assembly includes at least one bracket and at least one retaining assembly. The bracket can be movably positioned at multiple orientation angles with respect to a surface. The bracket includes a latching edge that defines multiple recesses. Each of the recesses corresponds to one of the orientation angles. The retaining assembly is positioned adjacent to the bracket. The retaining assembly includes at least one protrusion that can engage one of the recesses to form a latching connection between the bracket and the retaining assembly. The latching connection can retain the bracket at an orientation angle corresponding to the engaged recess.

In another aspect, a mounting assembly is provided for mounting a device for rotation in a lateral direction and a longitudinal direction with respect to a surface. The mounting assembly includes at least one first bracket, at least one second bracket coupled to the first bracket, at least one first retaining assembly, and at least one second retaining assembly. The first bracket can be movably positioned at multiple lateral orientation angles with respect to the surface. The first bracket includes a first latching edge defining multiple recesses. Each of the recesses corresponds to a lateral orientation angle. The first retaining assembly is positioned adjacent to the first bracket. The first retaining includes at least one first protrusion that can engage at least one of the recesses of the first latching edge to form a first latching connection between the first bracket and the first retaining assembly. The first latching connection can retain the first bracket at a given lateral orientation angle corresponding to the engaged recess. The second bracket can be movably positioned at multiple longitudinal orientation angles with respect to the surface. The second bracket includes a second latching edge defining multiple recesses. Each of the recesses corresponds to a longitudinal orientation angle. The second retaining assembly is positioned adjacent to the second bracket. The second retaining includes at least one second protrusion that can engage at least one of the recesses of the second latching edge to form a second latching connection between the second bracket and the second retaining assembly. The second latching connection can retain the second bracket at a given longitudinal orientation angle corresponding to the engaged recess. In another aspect, a mounting assembly is provided for mounting a device for rotation in a lateral direction and a longitudinal direction with respect to a surface. The mounting assembly includes at least one first bracket, at least one second bracket coupled to the first bracket, at least one first retaining assembly, and at least one second retaining assembly. The first bracket can be movably positioned at each of multiple lateral orientation angles with respect to the surface. The first retaining assembly can be positioned adjacent to the first bracket. The first retaining assembly can retain the first bracket at one of the lateral orientation angles. The second bracket is coupled to the first bracket. The second bracket can be movably positioned at each of multiple longitudinal orientation angles with respect to the surface. The second retaining assembly can be positioned adjacent to the second bracket. The second retaining assembly can retain the second bracket at one of the longitudinal orientation angles.

In another aspect, an assembly is provided. The assembly includes an antenna unit and a mounting assembly coupled to the antenna unit. The antenna unit can provide signal coverage in a geographic area. The mounting assembly includes at least one bracket and at least one retaining assembly. The bracket can be movably positioned at multiple orientation angles with respect to a surface. The bracket includes a latching edge that defines multiple recesses. Each of the recesses corresponds to one of the orientation angles. The retaining assembly is positioned adjacent to the bracket. The retaining assembly includes at least one protrusion that can engage one of the recesses to form a latching connection between the bracket and the retaining assembly. The latching connection can retain the bracket at an orientation angle corresponding to the engaged recess.

DETAILED DESCRIPTION

Figure 1:
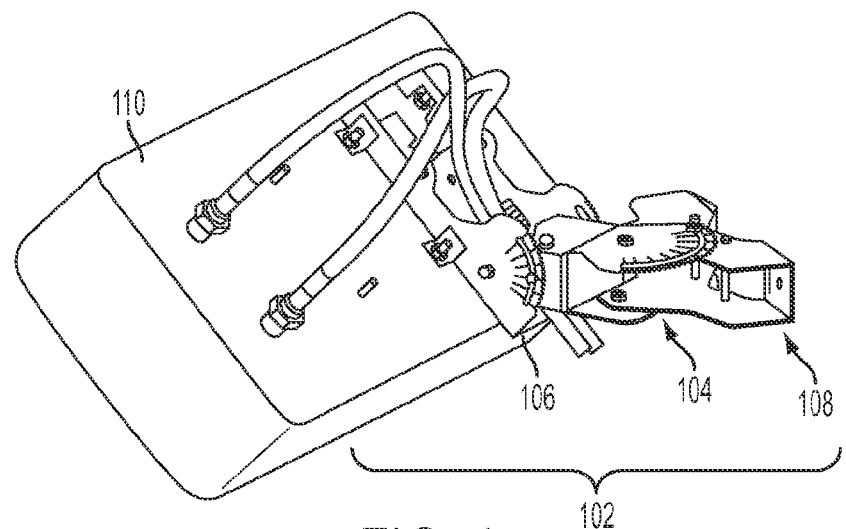
FIG. 1 is a perspective view of a latching mounting assembly for mounting a device according to one aspect.

Certain aspects and examples are directed to a latching mounting assembly for an antenna or other device. The latching mounting assembly, such as a pedestal, can be adjusted by rotating a longitudinal or lateral bracket of the latching mounting assembly from a first orientation angle, such as a tilt angle or azimuth angle, to a second orientation angle. The longitudinal bracket or lateral bracket can be rotated without removing fastening devices such as bolts or screws from the latching mounting assembly, thereby reducing the risk of an adjustment to the latching mounting assembly causing a loss of the fastening device.

Each of the longitudinal bracket and/or lateral bracket can be formed to include rounded gears or other latching edges. A latching edge can include grooves, teeth, or other recesses. The mounting assembly can include one or more retaining assemblies for engaging the latching edges. Each retaining assembly can engage the grooves, teeth, or other recesses of a respective bracket. A retaining assembly engaging the grooves, teeth, or other recesses can provide a latching connection between a bracket and the retaining assembly. The latching connection can retain the respective bracket of the latching mounting assembly at a given orientation angle. Such aspects can allow the bracket to be retained at the given orientation angle without using other fastening devices, such as screws or bolts, to hold the longitudinal or lateral bracket in a fixed position.

The retaining assembly can include a pin or other rigid protrusion coupled to or integral with a planar surface adjacent to a respective bracket. An example of a planar surface is as a metal plate. The planar surface can be configured to move in response to a force applied by the movement of the longitudinal bracket or lateral bracket in one or more directions. The movement of the planar can cause a pin or other protrusion of the retaining assembly to engage or disengage one of the recesses of a latching edge. For example, the planar surface can be coupled to a compression spring and/or be formed from a metal having a sufficient flexibility allowing the planar surface to move toward or away from the latching edge in response to the respective application or cessation of a force applied to the planar surface by a latching edge being moved. The movement of the planar surface to away from or toward the latching edge can cause the pin to respectively disengage or reengage the latching edge In additional or alternative aspects, the latching mounting assembly can indicate a change to an orientation angle using an audible indicator. The audible indicator can be generated by the retain assembly engaging a groove or other recess, similar to the operation of a ratchet. A non-limiting example of an audible indicator is a clicking noise.

In additional or alternative aspects, the latching mounting assembly can include one or more additional fastening devices, such as bolts or screws, which can be used with the one or more retaining assemblies. The one or more additional fastening devices can be tightened to retain a longitudinal or lateral bracket of the latching mounting assembly at a given orientation angle. The one or more additional fastening devices can be loosened to allow adjustment of the orientation angle of the latching mounting assembly. For example, an additional fastening device, such as a screw or bolt, can prevent the adjustment of a bracket by blocking the spring action of the retaining assembly. The screw or bolt can thus be used to modify the locking function of the latching mounting assembly. The locking function can be modified from the retaining assembly using a forced closure principle to provide a forced blocking function to the screw or bolt using a formed closure principle to provide a hard blocking function. The latching mounting assembly can obviate the need to remove screws during mounting process and reduce the number of parts that can be lost during adjustment.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present invention. The following aspects and examples use directional descriptions such as "above," "below," "upper," "lower," "upward," "downward," "left," "right," "lateral," "longitudinal," etc. in relation to the illustrative examples as they are depicted in the figures, the upward direction being toward the top of the corresponding figure, the downward direction being toward the bottom of the corresponding figure, the leftward direction being toward the left of the corresponding figure, and the rightward direction being toward the right of the corresponding figure.

FIG. 1 depicts a perspective view of a latching mounting assembly 102 for mounting a device 110. The latching mounting assembly 102 can include a lateral bracket 104, a longitudinal bracket 106, and a mounting mechanism 108. The latching mounting assembly 102 can be rotated or otherwise moved in a lateral direction by rotating or otherwise moving the lateral bracket 104. The latching mounting assembly 102 can be rotated or otherwise moved in a longitudinal direction by rotating or otherwise moving the longitudinal bracket 106. The latching mounting assembly 102 can be mounted or otherwise attached to an object or structure via the mounting mechanism 108.

A non-limiting example of a device 110 is an antenna unit. The antenna unit can be configured to provide signal coverage in a geographic area. Modifying an orientation angle of the lateral bracket 104 and/or the longitudinal bracket 106 can modify which portion of a geographic area is serviced by the antenna unit.

In some aspects, the mounting mechanism 108 can be attached to the lateral bracket 104 and the device 110 can be coupled to the longitudinal bracket 106, as depicted in FIG. 1. The longitudinal bracket 106 can include or be coupled to a planar mounting surface configured to be coupled to the device 110. In some aspects, the device 110 can be coupled to the mounting surface via one or more suitable fastening devices inserted through one or more openings in the planar surface of the longitudinal bracket 106, as depicted in FIG. 1. Non-limiting examples of suitable fastening devices include screws, bolts, wing nuts, etc. In other aspects, the device 110 can include one or more tabs and can be coupled to the mounting surface by inserting the tabs into one or more respective slots in the mounting surface or otherwise engaging the slots with the tabs. In other aspects, the mounting surface can include one or more tabs and can be coupled to the mounting surface by inserting the tabs into one or more respective slots in the body of the device 110 or otherwise engaging the slots with the tabs.

In other aspects, the longitudinal bracket 106 can be configured to be coupled to the mounting mechanism 108 and the lateral bracket 104 can be configured to be coupled or otherwise attached to the device 110. The lateral bracket 104 can include a planar mounting surface configured to be attached or coupled to the device 110 as described above.

Figure 2:
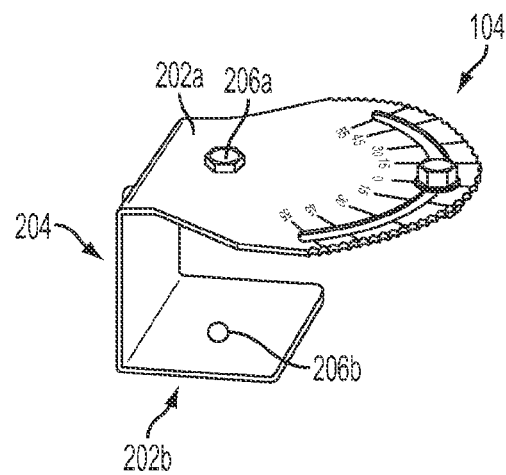
FIG. 2 is a perspective view of lateral bracket of a latching mounting assembly according to one aspect.

FIG. 2 is a perspective view depicting the lateral bracket 104. The lateral bracket 104 can include laterally oriented surfaces 202a, 202b and a longitudinally oriented connecting member 204.

In some aspects, the laterally oriented surfaces 202a, 202b can be oriented parallel or substantially parallel to the ground. The term "substantially parallel" is used herein to refer to an angle between two surfaces having a range between zero degrees and forty-five degrees. A non-limiting example of a laterally oriented surface can include a laterally oriented plate or other planar surface. The laterally oriented surfaces 202a, 202b can be formed from any suitable rigid or semi-rigid material, such as (but not limited to) metal or plastic. The laterally oriented surfaces 202a, 202b can be oriented substantially parallel to one another. The laterally oriented surfaces 202a, 202b can respectively include openings 206a, 206b. A suitable fastening device, such as (but not limited to) a rod or nut, can be positioned in one or more of the openings 206a, 206b to couple the lateral bracket 104 to the mounting mechanism 108.

Each of the laterally oriented surfaces 202a, 202b can be integral with or coupled to the longitudinally oriented connecting member 204. The longitudinally oriented connecting member 204 can be substantially perpendicular to the one or more laterally oriented surfaces. The term "substantially perpendicular" is used herein to refer to an angle between two surfaces having a range from forty-five degrees to ninety degrees.

Figure 3:
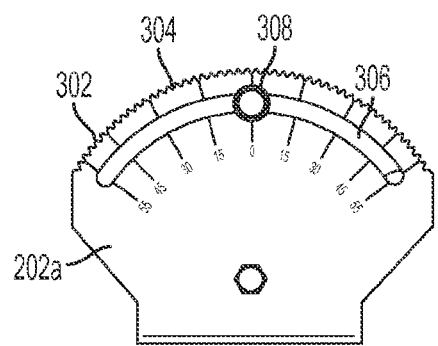
FIG. 3 is a top view of a latching edge of the lateral bracket according to one aspect.

At least one of the laterally oriented surfaces 202a, 202b of the lateral bracket 104 can include a latching edge. For example, FIG. 3 is a top view depicting a latching edge 302 formed from the laterally oriented surface 202a of the lateral bracket 104. The latching edge 302 can define an arc shape. The latching edge 302 can be formed to include a group of recesses 304. The recesses 304 can include multiple recesses of any suitable shape, such as (but not limited to) teeth, cogs, etc. The recesses 304 can be spaced at equal intervals from one another. Each of the recesses 304 can correspond to an increment in an orientation angle of the lateral bracket 104, such as (but not limited to) 2.5° or 5.0°.

In some aspects, a laterally oriented surface 202a can include an opening 306 308 configured to receive a fastening device. The opening 306 can be, for example, a lateral slot. The opening 306 can be shaped so as to be parallel to the latching edge 302. One or more fastening devices, such as a fastening device 308, can be inserted through the opening 306. Examples of fastening device can include, but are not limited to, a screw, a bolt, a wing nut, a pin, etc. The one or more fastening devices can be selectively tightened and loosened. Tightening the one or more fastening devices can prevent the lateral bracket 104 from being laterally rotated. Loosening the one or more fastening devices can allow the lateral bracket 104 to be laterally rotated. The one or more fastening devices can remain inserted through the opening 306. In other aspects, the one or more fastening devices can be omitted. Using a single fastening device or one or more fastening devices of the same type can allow the lateral orientation angle of the lateral bracket 104 to be adjusted using a single tool.

In some aspects, visual markers can be stamped or otherwise applied to one or more faces of the latching edge 302. Each of the visual markers can correspond to a lateral orientation angle of the lateral bracket 104.

Figure 4:
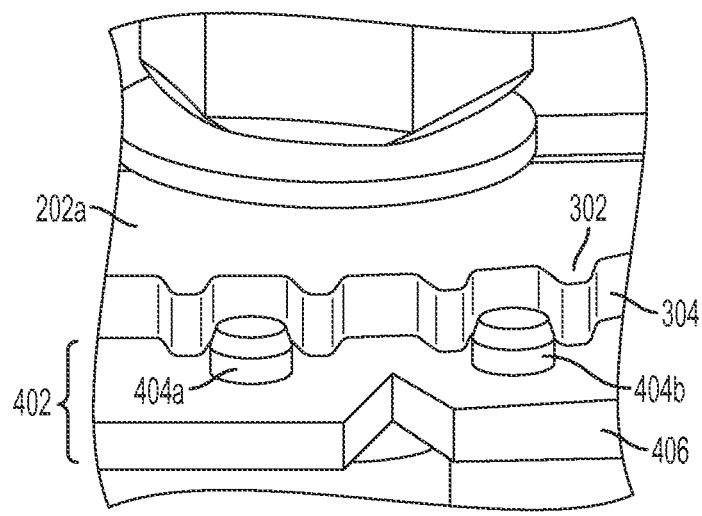
FIG. 4 is a partial perspective view of a latching edge of a lateral bracket engaging a retaining assembly according to one aspect.
Figure 5:
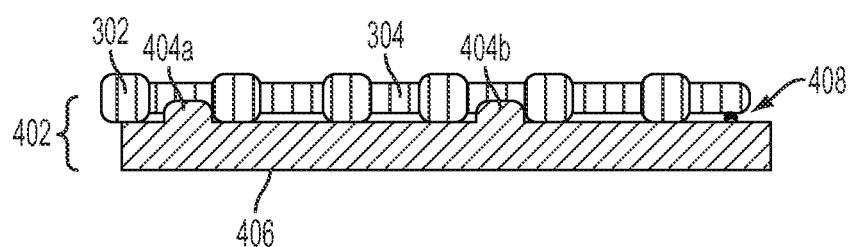
FIG. 5 is a side view of a latching edge of a lateral bracket engaging a retaining assembly according to one aspect.

The latching edge 302 can engage a retaining assembly of the lateral bracket 104 as depicted in FIGS. 4 and 5. FIG. 4 is a partial perspective view depicting a retaining assembly 402 engaging the latching edge 302 of the movable lateral bracket 104. The retaining assembly 402 can include retaining pins 404a, 404b or other suitable rigid protrusions coupled to or integral with a planar surface 406 adjacent to the laterally oriented surface 202a. The planar surface 406 can be formed from a rigid or semi-rigid material, such as sheet metal.

The retaining assembly 402 can be coupled to or adjacent to the laterally oriented surface 202a. The retaining assembly 402 can be positioned such that the retaining pins 404a, 404b can engage the recesses 304 of the latching edge 302. For example, the retaining assembly 402 can be oriented substantially parallel to the laterally oriented surface 202a and substantially perpendicular to the longitudinally oriented connecting member 204, as depicted in FIG. 4.

FIG. 5 is a side view depicting the retaining assembly 402 engaging the latching edge 302. In some aspects, the planar surface 406 can be coupled or adjacent to an expansion spring 408. An expansion spring can include a spring that is configured to resist a tensile, or stretching, force expanding the spring. The expansion spring 408 can be compressed by the retaining pins 404a, 404b engaging the recesses 304 of the latching edge 302.

Figure 6:
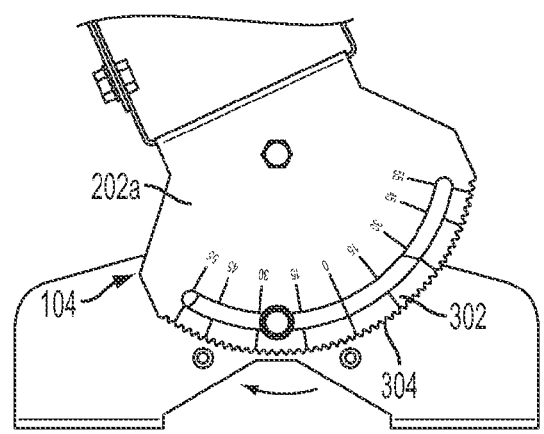
FIG. 6 is a top view of the lateral bracket being rotated according to one aspect.
Figure 7:
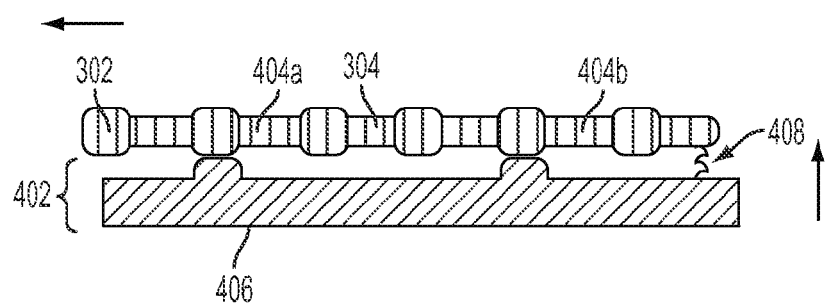
FIG. 7 is a side view of a latching edge of a lateral bracket disengaging from a retaining assembly according to one aspect.
Figure 8:
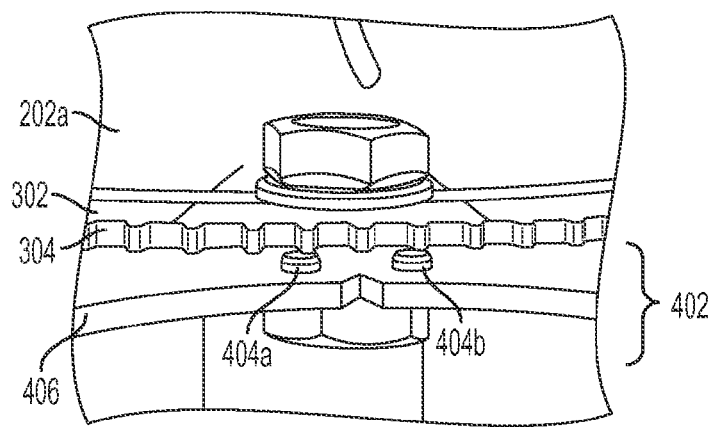
FIG. 8 is a partial perspective view of a latching edge of a lateral bracket disengaged from a retaining assembly according to one aspect.

The planar surface 406 can be configured to move in response to a force applied to the retaining pins 404a, 404b via one or more of the recesses 304, as depicted in FIGS. 6-10. FIG. 6 is a top view of lateral bracket 104 being moved. The movement of the lateral bracket 104 is depicted by a leftward arrow in FIGS. 6 and 7. A force applied to the retaining pin of the retaining assembly via one or more of the grooves or teeth can cause the retaining pins 404a, 404b to disengage from the recesses 304 and the expansion spring 408 to extend, as depicted by the upward arrow in FIG. 7. The disengagement of the retaining pins 404a, 404b from the recesses 304 is depicted in the partial perspective view of FIG. 8.

Figure 9:
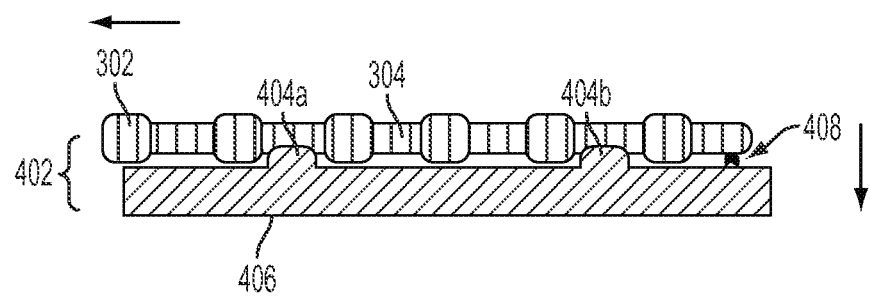
FIG. 9 is a side view of a latching edge of a lateral bracket reengaging a retaining assembly according to one aspect.
Figure 10:
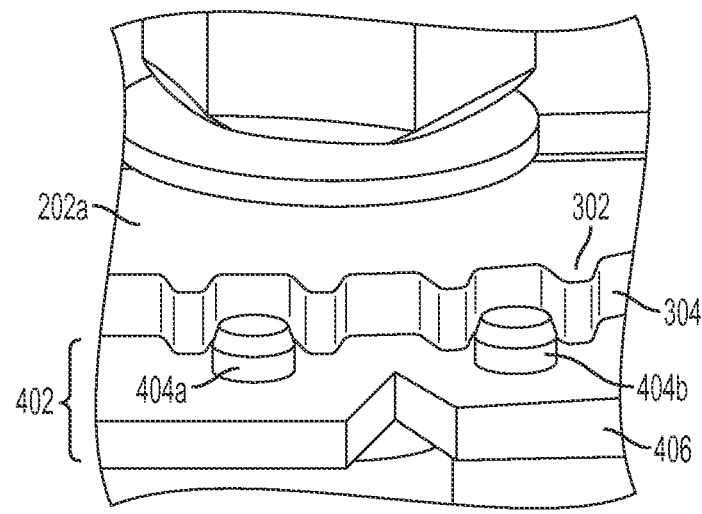
FIG. 10 is a partial perspective view of a latching edge of a lateral bracket reengaged with a retaining assembly according to one aspect.

Continuing to move the lateral bracket 104 can cause the retaining pins 404a, 404b to re-engage the recesses 304, as depicted in FIGS. 9 and 10. The movement of the lateral bracket is depicted by the leftward arrow in FIG. 9. The extended expansion spring 408 can apply a force to the latching edge 302 in a direction perpendicular to the latching edge 302 and in the direction of the planar surface 406. The force applied by the expansion spring 408 can be opposed by the static force provided by the portions of the latching edge 302 between the recesses 304. Moving the retaining pins 404a, 404b to engage another set of the recesses 304 can cause the opposing static force to cease, thereby allowing the expansion spring 408 to compress and move the lateral bracket 104 toward the planar surface 406, as depicted by the downward arrow in FIG. 9. Moving the lateral bracket 104 toward the planar surface 406 can cause the retaining pins 404a, 404b to re-engage the recesses 304, as depicted in FIG. 10.

Figure 11:
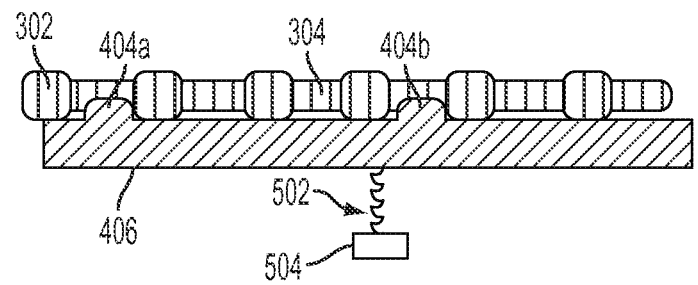
FIG. 11 is a side view of a latching edge of a lateral bracket engaged with a retaining assembly according to one aspect.
Figure 12:
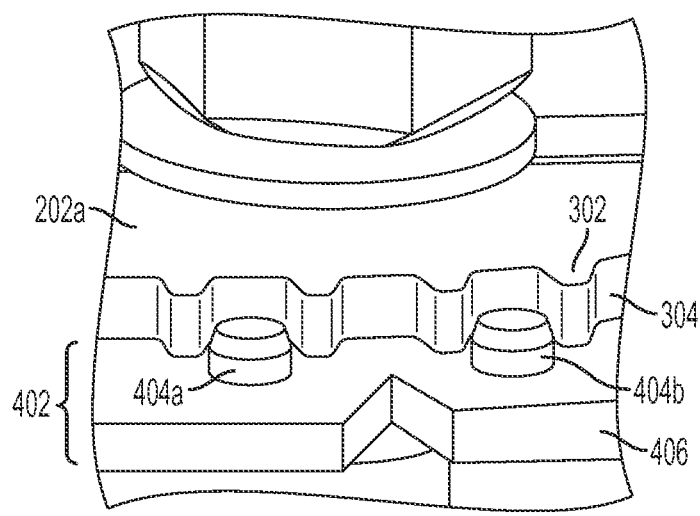
FIG. 12 is a partial perspective view of a latching edge of a lateral bracket engaged with a retaining assembly according to one aspect.

In other aspects, a compression spring can be used to cause the retaining pins 404a, 404b to engage the recesses 304. For example, FIG. 12 depicts a compression spring 502 causing the retaining pins 404a, 404b to engage the recesses 304. The compression spring 502 can be adjacent to or coupled to a fixed object 504. A compression spring can include a spring that is configured to resist an applied force compressing the spring. The compression spring 502 can expand and apply a force against the planar surface 406 in the direction of the latching edge 302, as depicted by the upward arrow in FIG. 11. The force applied to the planar surface 406 can cause the retaining pins 404a, 404b to engage the recesses 304, as depicted in FIG. 12.

Figure 13:
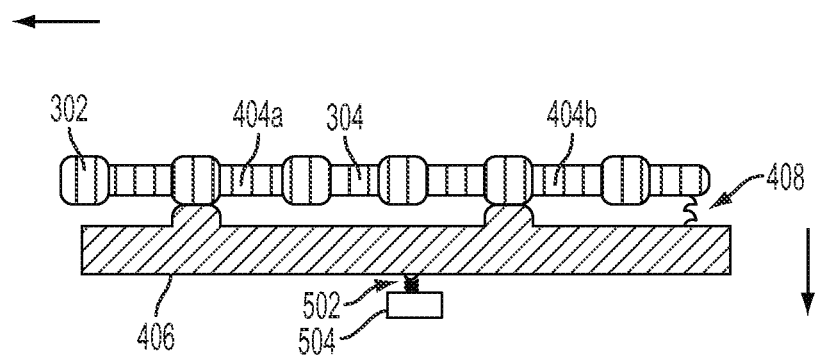
FIG. 13 is a side view of a latching edge of a lateral bracket disengaging a retaining assembly according to one aspect.
Figure 14:
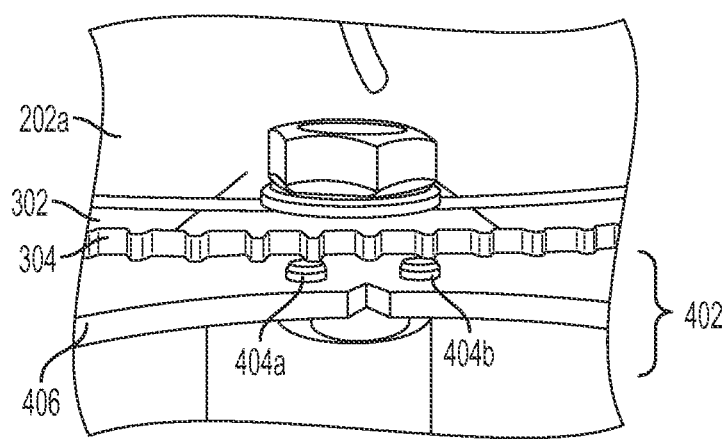
FIG. 14 is a partial perspective view of a latching edge of a lateral bracket disengaged from a retaining assembly according to one aspect.

FIG. 13 depicts the movement of the lateral bracket 104 using a leftward arrow. A force applied to the retaining pins 404a, 404b by the movement of the lateral bracket can cause the retaining pins 404a, 404b to disengage from the recesses 304 and the compression spring 502 to compress, as depicted by the downward arrow in FIG. 13. The disengagement of the retaining pins 404a, 404b from the recesses 304 is depicted in the partial perspective view of FIG. 14.

Figure 15:
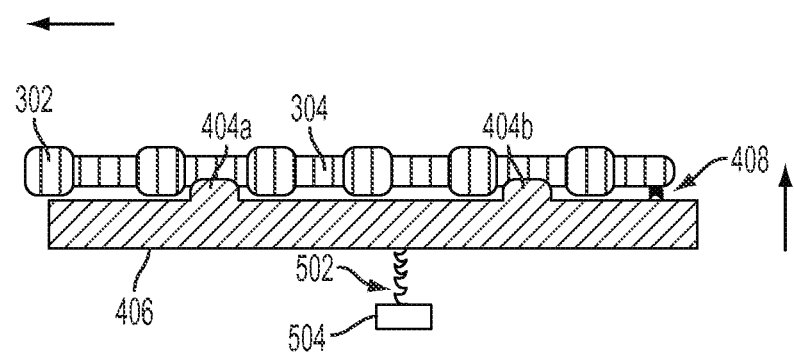
FIG. 15 is a side view of a latching edge of a lateral bracket reengaging a retaining assembly according to one aspect.
Figure 16:
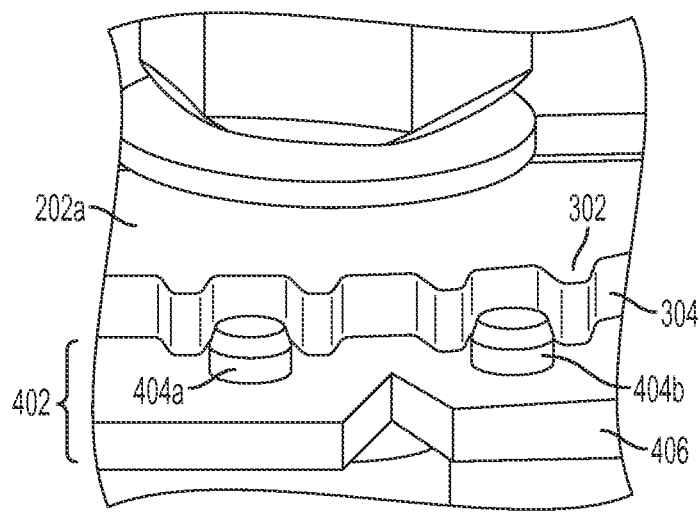
FIG. 16 is a side view of a latching edge of a lateral bracket reengaged with a retaining assembly according to one aspect.

Continuing to move the lateral bracket 104 can cause the retaining pins 404a, 404b to re-engage the recesses 304, as depicted in FIGS. 15 and 16. The movement of the lateral bracket is depicted by the leftward arrow in FIG. 15. The compressed compression spring 502 can apply a force to the planar surface 406 in a direction perpendicular to the planar surface 406 and in the direction of the latching edge 302. The force applied by the compression spring 502 can be opposed by the static force provided by the portions of the latching edge 302 between the recesses 304. Moving the retaining pins 404a, 404b to engage another set of the recesses 304 can cause the opposing static force to cease, thereby allowing the compression spring 502 to extend and move the planar surface 406 toward the latching edge 302, as depicted by the upward arrow in FIG. 15. Moving the planar surface 406 toward the latching edge 302 can cause the retaining pins 404a, 404b to re-engage the recesses 304, as depicted in FIG. 16.

In some aspects, the compression of the expansion spring 408 and/or the expansion of the compression spring 502 can generate an audible indicator, such as a clicking noise. Generating an audible indicator can allow the angle of the lateral bracket 104 to be adjusted without viewing visual markers corresponding to the respective lateral orientation angles of the lateral bracket 104.

In additional or alternative aspects, the expansion spring 408 and/or the compression spring 502 may be omitted. The metal or other material from which the planar surface 406 is formed can be sufficiently flexible such that a force applied to the retaining pins 404a, 404b can cause the retaining pins 404a, 404b to disengage from the recesses 304. The metal or other material can have a sufficient resilience such that the cessation of a force applied to the retaining pins 404a, 404b via the latching edge 302 can cause the retaining pins 404a, 404b of the retaining assembly to reengage the recesses 304.

Figure 17:
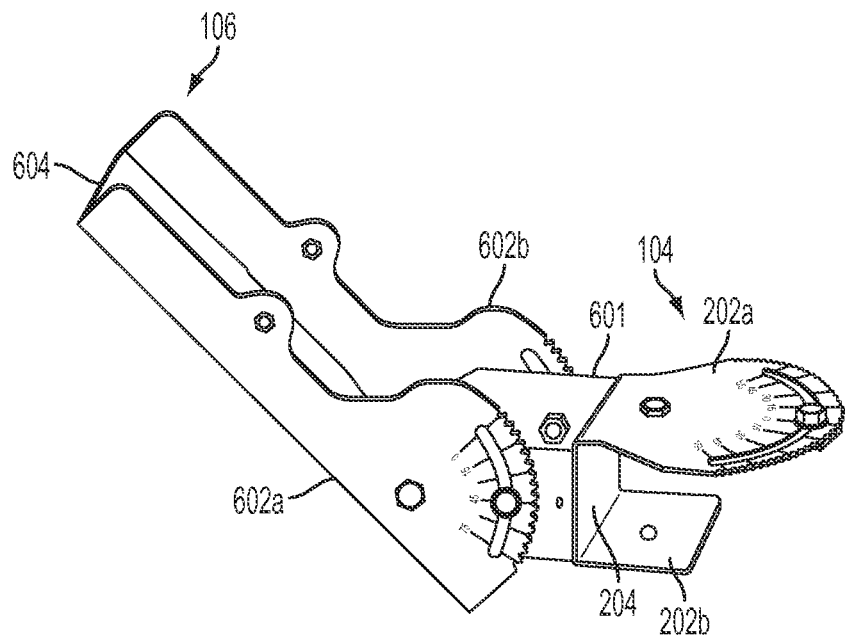
FIG. 17 is a perspective view of a lateral bracket coupled to a longitudinal bracket of a latching mounting assembly according to one aspect.

FIG. 17 depicts a perspective view of the lateral bracket 104 coupled to the longitudinal bracket 106 via a mounting surface 601. The longitudinally oriented connecting member 204 of the lateral bracket 104 can be coupled to or integral with the mounting surface 601. The longitudinal bracket 106 can be coupled to the mounting surface 601 via any suitable fastening device. Non-limiting examples of suitable fastening devices include screws, bolts, wing nuts, etc.

The longitudinal bracket 106 can include longitudinally oriented surfaces 602a, 602b and a laterally oriented connecting member 604. In some aspects, the longitudinally oriented surfaces 602a, 602b can be oriented perpendicular or substantially perpendicular to the ground. Examples of a longitudinally oriented surface can include a longitudinally oriented plate formed from metal or another suitable rigid or semi-rigid material. Each of the longitudinally oriented surfaces 602a, 602b can be integral with or coupled to the laterally oriented connecting member 604.

Figure 18:
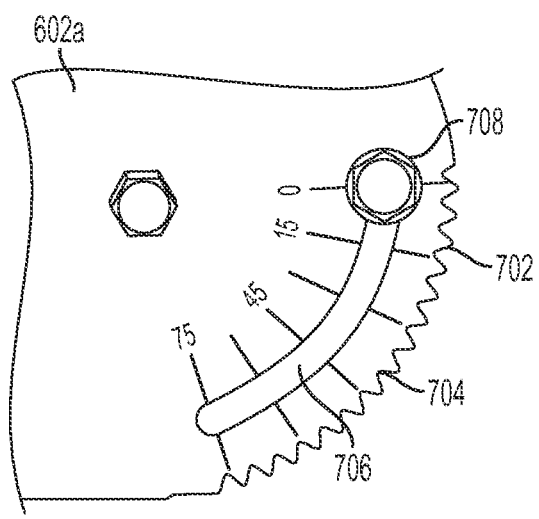
FIG. 18 is a side view of a latching edge of the longitudinal bracket according to one aspect.

At least one of the longitudinally oriented surfaces 602a, 602b of the longitudinal bracket 106 can include a latching edge. For example, FIG. 18 is a side view depicting a latching edge 702 formed in the longitudinally oriented surface 602a of the longitudinal bracket 106. The latching edge 702 can define an arc shape. A latching edge of each of the longitudinally oriented surfaces 602a, 602b can be formed to include a group of grooves, such as the recesses 704 of the latching edge 702. The recesses 704 can include any suitable shape, such as (but not limited to) teeth, cogs, etc. The recesses 704 can be spaced at equal intervals from one another. Each of the recesses 704 can correspond to an increment in the angle of the bracket, such as (but not limited to) 2.5° or 5.0°. In some aspects, visual markers can be stamped or otherwise applied to one or more faces of the longitudinally oriented surfaces 602a, 602b. Each of the visual markers can correspond to a longitudinal orientation angle of the longitudinal bracket 106.

In some aspects, each of the longitudinally oriented surfaces 602a, 602b can include an opening configured to receive a fastening device, such as the opening 706 in the longitudinally oriented surface 602a. The opening 706 can be, for example, a longitudinal slot. The longitudinal slot can be shaped to as to be parallel to the latching edge 702. One or more fastening devices, such as a fastening device 708, can be inserted through the opening 706. Examples of fastening device can include, but are not limited to, a screw, a bolt, a wing nut, a pin, etc. The one or more fastening devices can be selectively tightened and loosened. Tightening the one or more fastening devices can prevent the longitudinal bracket 106 from being longitudinally rotated. Loosening the one or more fastening devices can allow the longitudinal bracket 106 to be longitudinally rotated. In other aspects, the one or more fastening devices can be omitted. Using a single fastening device or one or more fastening devices of the same type can allow the longitudinal orientation angle of the longitudinal bracket 106 to be adjusted using a single tool.

Figure 19:
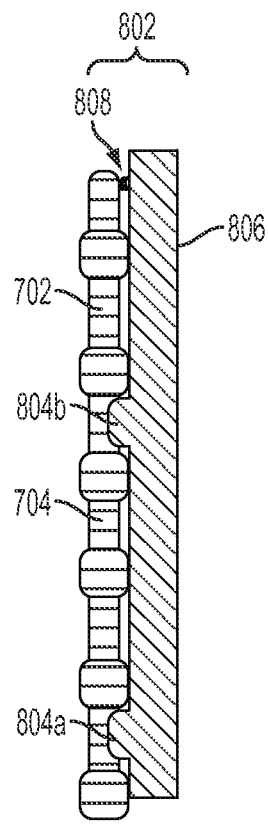
FIG. 19 is a side view of a longitudinal bracket engaged with a retaining assembly according to one aspect.
Figure 20:
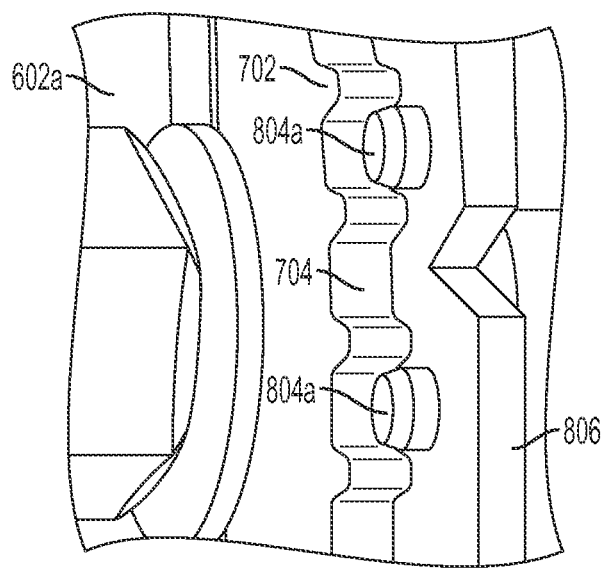
FIG. 20 is a perspective side view of a longitudinal bracket engaged with a retaining assembly according to one aspect.

The latching edge 702 can engage a retaining assembly coupled to the longitudinal bracket 106, as depicted in FIGS. 19-20. FIG. 19 is a side view depicting a retaining assembly 802 engaging the latching edge 702 of the movable longitudinal bracket 106. The retaining assembly 802 can include retaining pins 804a, 804b or other suitable rigid protrusions coupled to or integral with a planar surface 806 adjacent to the longitudinally oriented surface 602a. The planar surface 806 can be formed from a rigid or semi-rigid material, such as sheet metal.

The retaining assembly 802 can be coupled to or adjacent to the longitudinally oriented surface 602a. The retaining assembly 802 can be positioned such that a retaining pins 804a, 804b can engage the recesses 704 of the latching edge 702. For example, the retaining assembly 802 can be oriented substantially parallel to the longitudinally oriented surface 602a and substantially perpendicular to the laterally oriented connecting member 604.

FIG. 20 is a partial perspective view depicting the retaining assembly 802 engaging the latching edge 702. In some aspects, the planar surface 806 can be coupled or adjacent to an expansion spring 808. The expansion spring 808 can be compressed by the retaining pins 804a, 804b engaging the recesses 704 of the latching edge 702.

Figure 21:
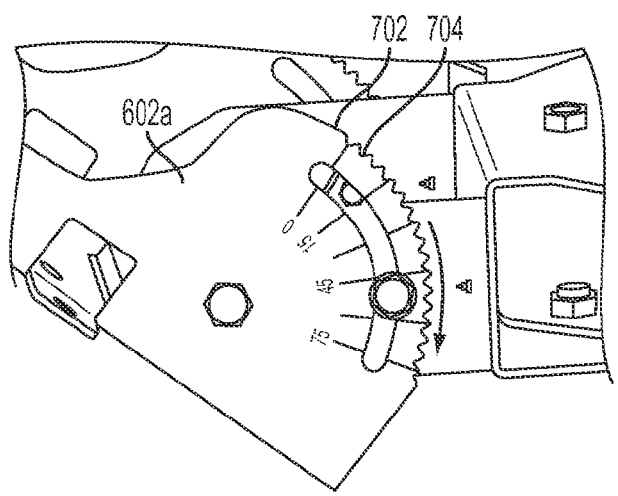
FIG. 21 is a perspective side view of the longitudinal bracket being rotated according to one aspect.
Figure 22:
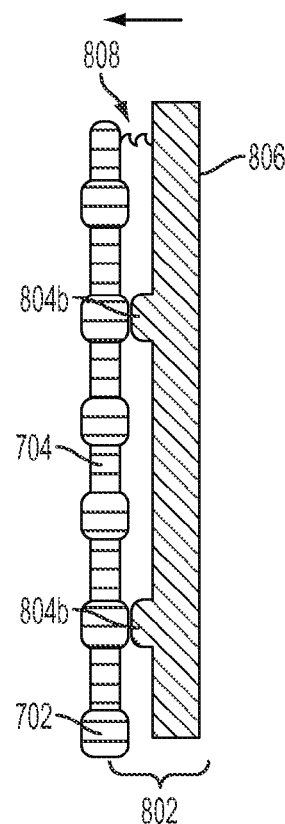
FIG. 22 is a side view of a latching edge of a longitudinal bracket disengaging from a retaining assembly according to one aspect.
Figure 23:
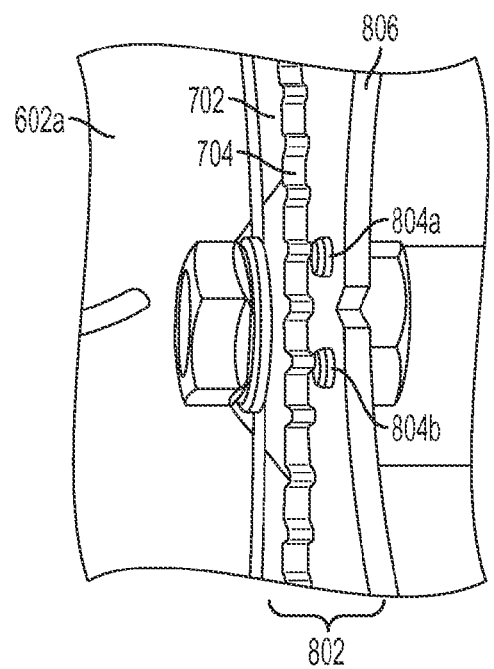
FIG. 23 is a partial perspective view of a latching edge of a longitudinal bracket disengaged from a retaining assembly according to one aspect.

The planar surface 806 can be configured to move in response to a force applied to the retaining pins 804a, 804b via one or more of the recesses 704, as depicted in FIGS. 21-25. FIG. 21 is a partial perspective side view of longitudinal bracket 106 being moved. The movement of the longitudinal bracket 106 is depicted by a downward arrow in FIGS. 21 and 22. A force applied to the retaining pin of the retaining assembly via one or more of the grooves or teeth can cause the retaining pins 804a, 804b to disengage from the recesses 704 and the expansion spring 808 to extend, as depicted by the leftward arrow in FIG. 22. The disengagement of the retaining pins 804a, 804b from the recesses 704 is depicted in the partial perspective view of FIG. 23.

Figure 24:
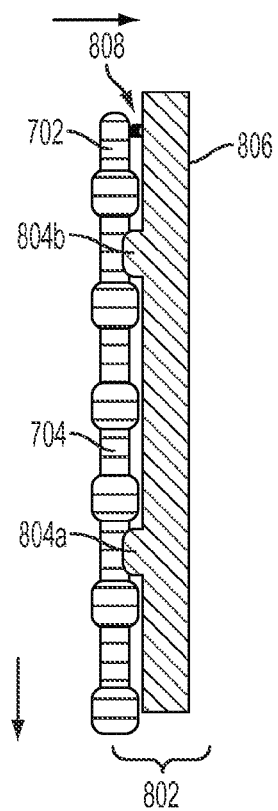
FIG. 24 is a side view of a latching edge of a longitudinal bracket reengaging a retaining assembly according to one aspect.
Figure 25:
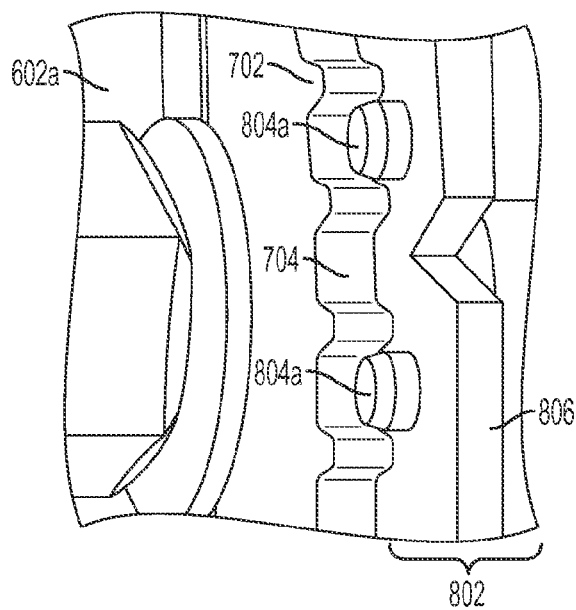
FIG. 25 is a partial perspective view of a latching edge of a longitudinal bracket reengaged with a retaining assembly according to one aspect.

Continuing to move the longitudinal bracket 106 can cause the retaining pins 804a, 804b to re-engage the recesses 704, as depicted in FIGS. 24 and 25. The movement of the lateral bracket is depicted by the downward arrow in FIG. 24. The extended expansion spring 808 can apply a force to the latching edge 702 in a direction perpendicular to the latching edge 702 and in the direction of the planar surface 806. The force applied by the expansion spring 808 can be opposed by the static force provided by the portions of the latching edge 302 between the recesses 704. Moving the retaining pins 804a, 804b to engage another set of the recesses 704 can cause the opposing static force to cease, thereby allowing the expansion spring 808 to compress and move the longitudinal bracket 106 toward the planar surface 806, as depicted by the rightward arrow in FIG. 24. Moving the longitudinal bracket 106 toward the planar surface 806 can cause the retaining pins 804a, 804b to re-engage the recesses 704, as depicted in FIG. 25.

Figure 26:
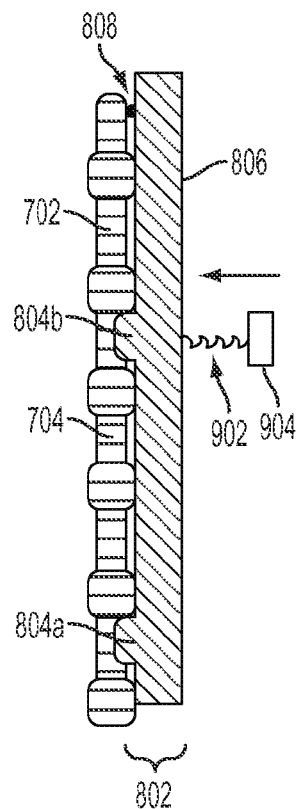
FIG. 26 is a side view of a latching edge of a longitudinal bracket engaged with a retaining assembly according to one aspect.
Figure 27:
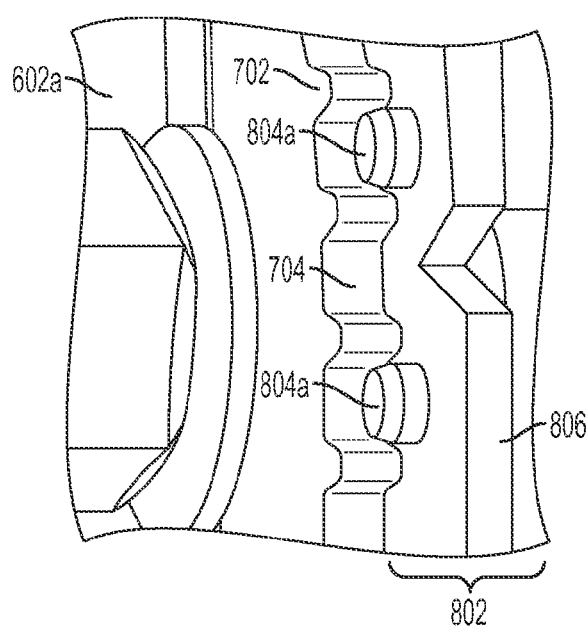
FIG. 27 is a partial perspective view of a latching edge of a longitudinal bracket engaged with a retaining assembly according to one aspect.

In other aspects, a compression spring can be used to cause the retaining pins 804a, 804b to engage the recesses 704. For example, FIG. 12 depicts a compression spring 902 causing the retaining pins 804a, 804b to engage the recesses 704. The compression spring 902 can be adjacent to or coupled to a fixed object 904. The compression spring 902 can expand and apply a force against the planar surface 806 in the direction of the latching edge 702, as depicted by the leftward arrow in FIG. 26. The force applied to the planar surface 806 can cause the retaining pins 804a, 804b to engage the recesses 704, as depicted in FIG. 27.

Figure 28:
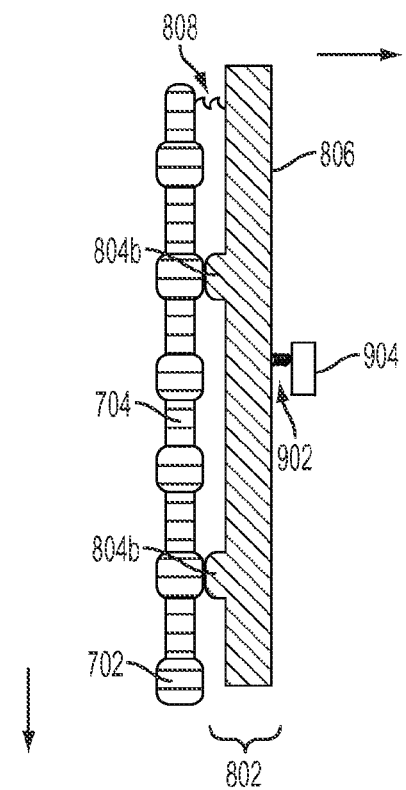
FIG. 28 is a side view of a latching edge of a longitudinal bracket disengaging a retaining assembly according to one aspect.
Figure 29:
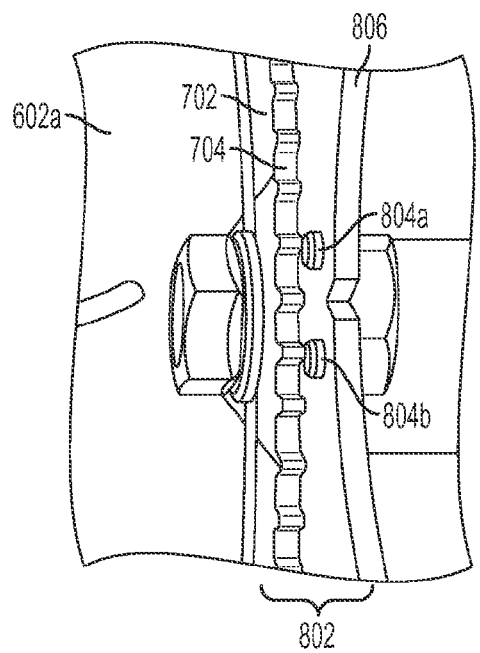
FIG. 29 is a partial perspective view of a latching edge of a longitudinal bracket disengaged from a retaining assembly according to one aspect.

FIG. 28 depicts the movement of the longitudinal bracket 106. A force applied to the retaining pins 804a, 804b by the movement of the lateral bracket can cause the retaining pins 804a, 804b to disengage from the recesses 704 and the compression spring 902 to compress, as depicted by the downward arrow in FIG. 28. The disengagement of the retaining pins 804a, 804b from the recesses 704 is depicted in the partial perspective view of FIG. 29.

Figure 30:
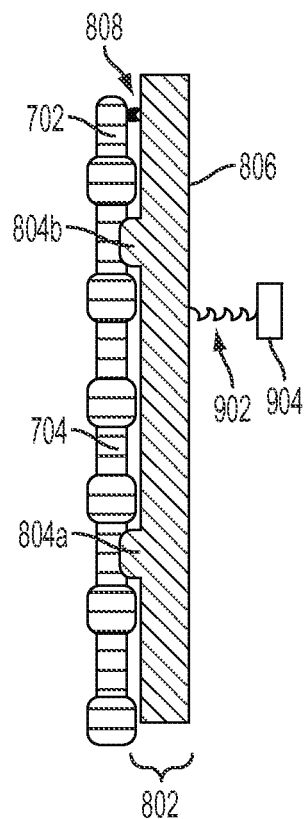
FIG. 30 is a side view of a latching edge of a longitudinal bracket reengaging a retaining assembly according to one aspect.
Figure 31:
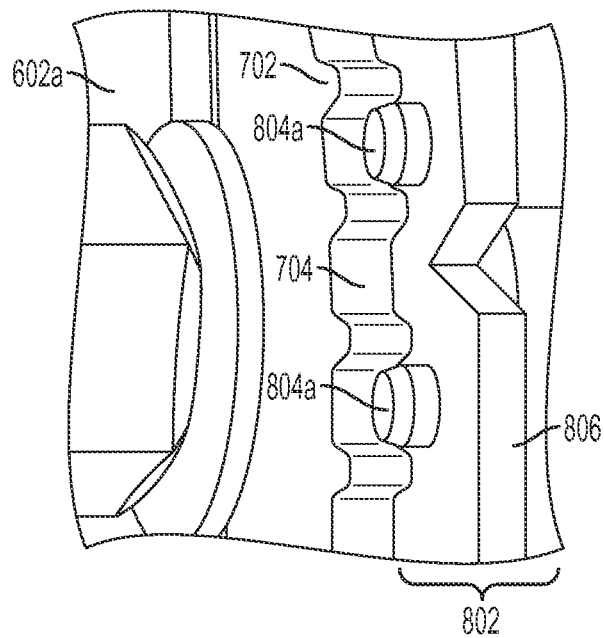
FIG. 31 is a side view of a latching edge of a longitudinal bracket reengaged with a retaining assembly according to one aspect.

Continuing to move the longitudinal bracket 106 can cause the retaining pins 804a, 804b to re-engage the recesses 704, as depicted in FIGS. 30 and 31. The movement of the lateral bracket is depicted by the downward arrow in FIG. 30. The compressed compression spring 902 can apply a force to the planar surface 806 in a direction perpendicular to the planar surface 806 and in the direction of the latching edge 702. The force applied by the compression spring 902 can be opposed by the static force provided by the portions of the latching edge 302 between the recesses 704. Moving the retaining pins 804a, 804b to engage another set of the recesses 704 can cause the opposing static force to cease, thereby allowing the compression spring 902 to extend and move the planar surface 806 toward the latching edge 702, as depicted by the leftward arrow in FIG. 30. Moving the planar surface 806 toward the latching edge 702 can cause the retaining pins 804a, 804b to re-engage the recesses 704, as depicted in FIG. 31.

In some aspects, the compression of the expansion spring 808 and/or the expansion of the compression spring 902 can generate an audible indicator, such as a clicking noise. Generating an audible indicator can allow the angle of the longitudinal bracket 106 to be adjusted without viewing the visual markers corresponding to the respective longitudinal orientation angles of the longitudinal bracket 106.

In additional or alternative aspects, the expansion spring 808 and/or the compression spring 902 may be omitted. The metal or other material from which the planar surface 806 is formed can be sufficiently flexible such that a force applied to the retaining pins 804a, 804b can cause the retaining pins 804a, 804b to disengage from the recesses 704. The metal or other material can have a sufficient resilience such that the cessation of a force applied to the retaining pins 804a, 804b via the latching edge 702 can cause the retaining pins 804a, 804b of the retaining assembly to reengage the recesses 704.

Figure 32:
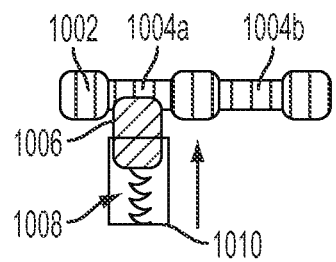
FIG. 32 is a side view of a spring-loaded retaining pin engaging a recess of a latching edge according to one aspect.
Figure 33:
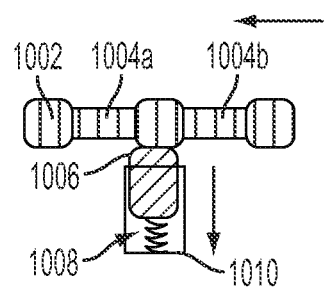
FIG. 33 is a side view of a spring-loaded retaining pin disengaging a recess of a latching edge according to one aspect.
Figure 34:
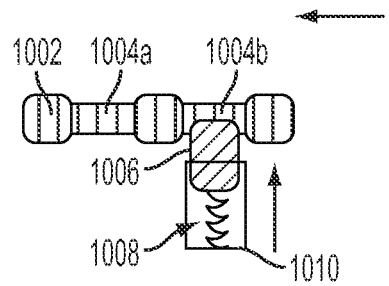
FIG. 34 is a side view of a spring-loaded retaining pin reengaging a recess of a latching edge according to one aspect.

In additional or alternative aspects, one or more of the retaining assemblies 402, 802 can include one or more chambers, one or more compression springs disposed in the respective one or more chambers, and one or more retaining pins disposed in each of the one or more chambers adjacent to the respective one or more compression springs, as depicted in FIGS. 32-34. FIG. 32 depicts a latching edge 1002 that includes recesses 1004a, 1004b. Examples of a latching edge 1002 include a latching edge 302 or a latching edge 702. Examples of the recesses 1004a, 1004b include the recesses 304 or the recesses 704. A retaining pin 1006 can engage one of the recesses 1004a, 1004b. FIG. 32 depicts the retaining pin engaging the recess 1004a. The retaining pin 1006 can be wholly or partially disposed within a chamber 1010. A compression spring 1008 positioned adjacent to the retaining pin 1006 can exert a force against the retaining pin 1006 in the direction of the latching edge 1002. The compression spring 1008 can be wholly or partially disposed within a chamber 1010. The retaining pin 1006, the compression spring 1008, and the chamber 1010 can be disposed in a retaining assembly, such as one or more of the retaining assemblies 402, 802.

Rotating the latching edge 1002, as depicted by the leftward arrow in FIG. 33, can cause a portion of the latching edge 1002 between the recesses 1004a, 1004b to exert a force against the retaining pin 1006 in the direction of the chamber 1010, as depicted by the downward arrow in FIG. 33. The force exerted against the retaining pin 1006 can cause the retaining pin to exert a force against the compression spring 1008, thereby causing the compression spring 1008 to compress. Rotating the latching edge 1002 further can allow the compression spring 1008 to expand. The compression spring 1008 expanding can apply a force to the retaining pin 1006 in the direction of the latching edge 1002, as depicted by the upward arrow in FIG. 34. Applying the force to the retaining pin 1006 in the direction of the latching edge 1002 can cause the retaining pin 1006 to engage the recess 1004b.

Expanding the compression spring 1008 can generate an audible indicator, such as a clicking noise. Generating an audible indicator can allow the angle of a bracket (such as the lateral bracket 104 or the longitudinal bracket 106) to be adjusted without viewing a visual marker corresponding to the orientation angle of the bracket.

Although FIGS. 32-34 depicts a single retaining pin 1006 disposed in a single chamber 1010, any number of retaining pins disposed in respective chambers can be used.

Figure 35:
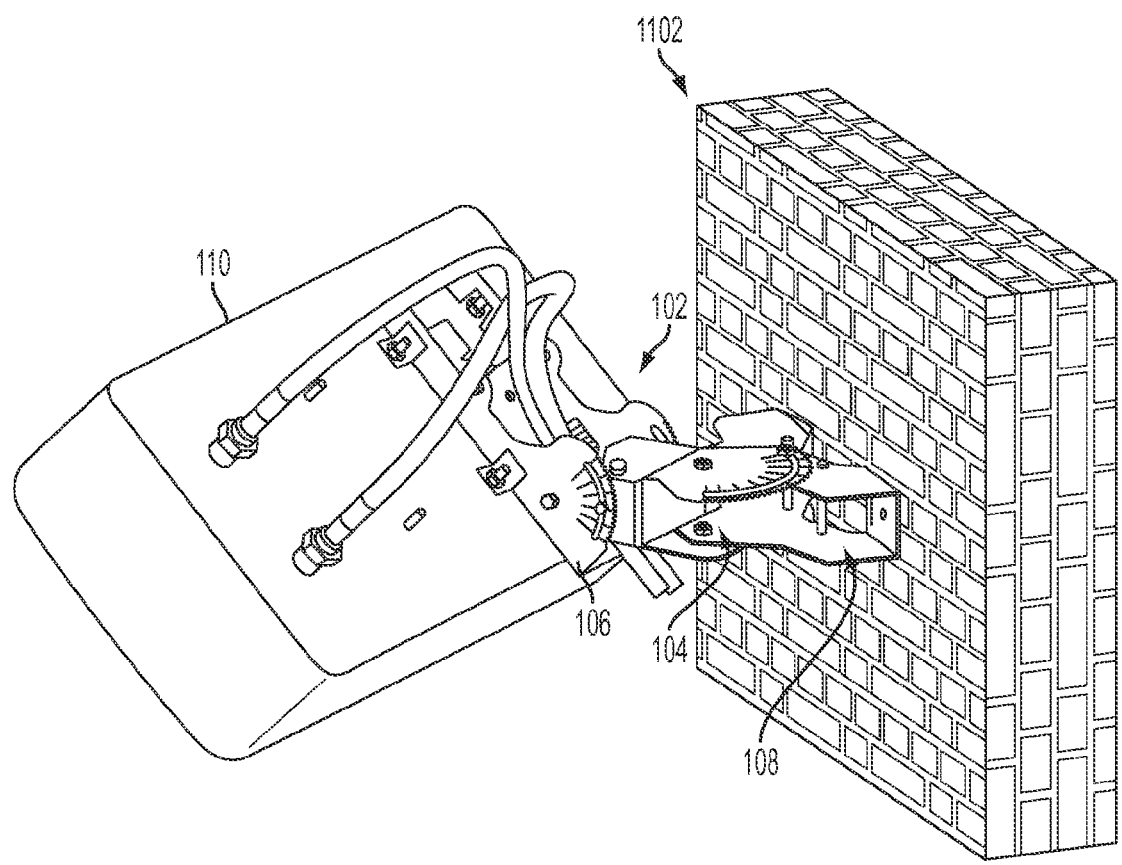
FIG. 35 is a perspective view of a latching mounting assembly mounting a device mounted to a wall according to one aspect.

FIG. 35 depicts an example of a latching mounting assembly 102 mounting a device 110 to a wall 1102 via the mounting mechanism 108. The mounting mechanism 108 can include any suitable device, structure, or group of devices and/or structures for coupling the latching mounting assembly 102 to a fixed structure. The mounting mechanism 108 can include a bracket having a flat surface. The flat surface can be attached to a wall using any suitable fastening devices, such as, for example, one or more screws, one or more nails, one or more bolts, etc.

Figure 36:
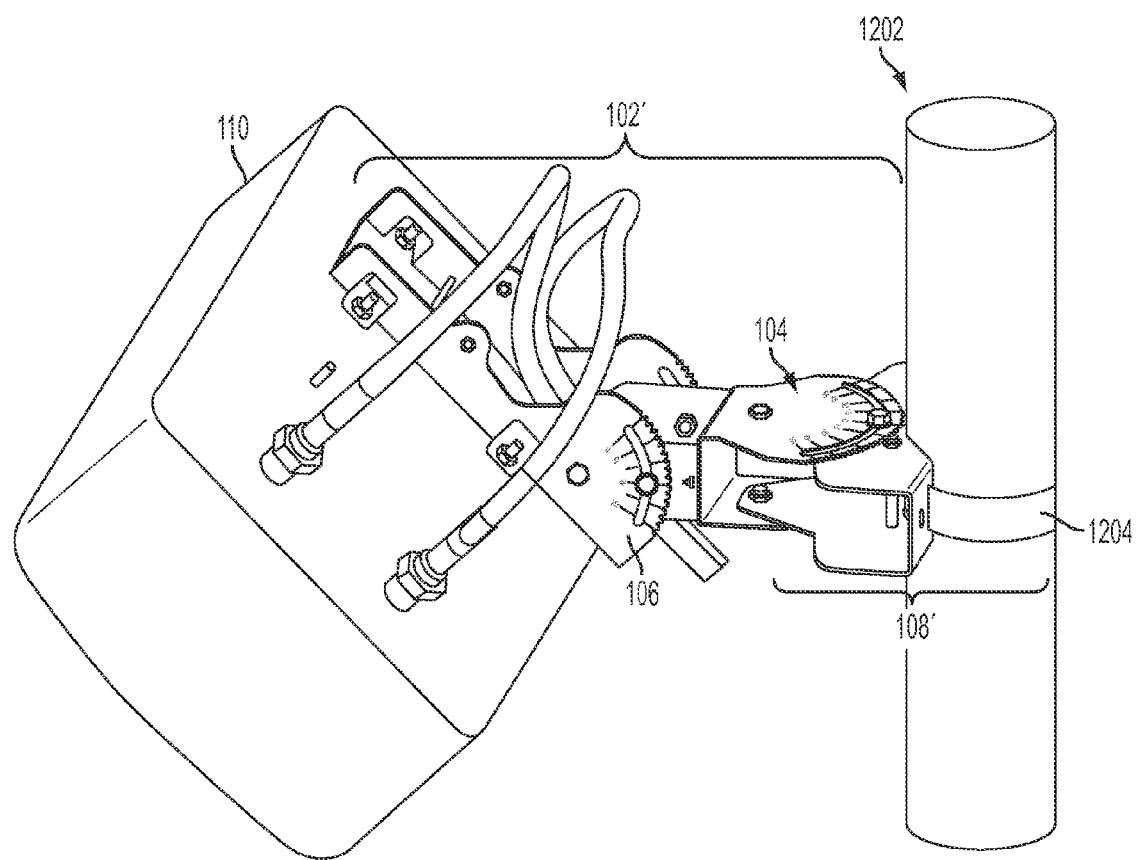
FIG. 36 is a perspective view of a latching mounting assembly mounting a device mounted to a pole according to one aspect.

FIG. 36 depicts an example of a latching mounting assembly 102' mounting a device 110 to a pole 1202 via the mounting mechanism 108'. The mounting mechanism 108' can include one or more clamps, such as the clamp 1204. The clamp 1204 can be adapted to circumferentially surround a mounting member, such as the pole 1202. The clamp 1204 can be secured using, for example, a screw or bolt. The clamp 1204 can be tightened such that friction retains the mounting mechanism 108' in position on the pole 1202. An adhesive or other material having a surface with a sufficient friction coefficient can be disposed between a surface of each of the clamp 1204 and the pole 1202. Disposing the adhesive or other material can increase friction used to retain the mounting mechanism 108' in a position on the pole 1202.

In some aspects, the clamp 1204 can be oriented substantially perpendicular to the ground such that the latching mounting assembly 102' can be coupled to a laterally oriented pole. In other aspects, the clamp 1204 can be oriented substantially parallel to the ground such that the latching mounting assembly 102' can be coupled to a longitudinally oriented pole.

The maximum angle of the longitudinal orientation and/or lateral orientation can be determined by the type of mounting mechanism 108, the dimensions of the one or more laterally oriented surfaces, the dimensions of the longitudinally oriented surfaces 602a, 602b and/or the dimensions of the device mounted using the latching mounting assembly 102. In some aspects, the dimensions of the laterally oriented surfaces 202a, 202b, the dimensions of the longitudinally oriented surfaces 602a, 602b and/or the dimensions of the device 110 can be such that the maximum angle of the longitudinal orientation and/or lateral orientation is seventy-five degrees. In other aspects, the dimensions of the laterally oriented surfaces 202a, 202b, the dimensions of the longitudinally oriented surfaces 602a, 602b and/or the dimensions of the device can be such that the maximum angle of the longitudinal orientation and/or lateral orientation is 180 degrees.

Although FIGS. 1-36 depict a lateral bracket 104 having two laterally oriented surfaces and a longitudinal bracket 106 having longitudinally oriented surfaces, other configurations are possible. In some aspects, a lateral bracket 104 can have a single laterally oriented surface. In other aspects, a longitudinal bracket 106 can have a single longitudinally oriented surface.

The foregoing description of aspects and features of the invention, including illustrated examples, has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. Aspects and features from each example disclosed can be combined with any other example. The illustrative examples described above are given to introduce the reader to the general subject matter discussed here and are not intended to limit the scope of the disclosed concepts.

What is claimed is:

1. A mounting assembly for mounting a device, the mounting assembly comprising:

at least one bracket movably positionable at each of a plurality of orientation angles with respect to a surface and comprising a latching edge defining a plurality of recesses, each of the plurality of recesses corresponding to a respective one of the plurality of orientation angles; and at least one retaining assembly positionable adjacent to the at least one bracket, the at least one retaining assembly comprising at least one protrusion adapted to engage at least one recess of the plurality of recesses to form a latching connection between the at least one bracket and the at least one retaining assembly;

wherein the latching connection is configured to retain the at least one bracket at a respective one of the plurality of orientation angles corresponding to the at least one reces; and wherein the latching edge is formed from a semi-rigid material, the semi-rigid material adapted to bend away from the at least one retaining assembly in response to a force applied by the at least one protrusion to a portion of the latching edge between two of the plurality of recesses and further adapted to bend toward the at least one retaining assembly in response to a cessation of the force.

2. The mounting assembly of claim 1, wherein the at least one bracket is adapted to be laterally positioned with respect to the surface at each of the plurality of orientation angles and further comprising:

at least one additional bracket adapted to be movably and longitudinally positioned at each of an additional plurality of orientation angles with respect to the surface and comprising an additional latching edge, the additional latching edge defining an additional plurality of recesses, each of the additional plurality of recesses corresponding to a respective one of the additional plurality of orientation angles; and at least one additional retaining assembly positionable adjacent to the at one least additional bracket, the at least one additional retaining assembly comprising at least one additional protrusion adapted to engage at least one additional recess of the additional plurality of recesses to form an additional latching connection between the at least one additional bracket and the at least one additional retaining assembly, wherein the additional latching connection is configured to retain the at least one additional bracket at a respective one of the additional plurality of orientation angles corresponding to the at least one additional recess.

3. The mounting assembly of claim 1, further comprising a mounting mechanism configured for coupling the mounting assembly to at least one of a structure or a fixed object.

4. The mounting assembly of claim 1, wherein the device comprises an antenna unit.

5. The mounting assembly of claim 1, wherein the at least one bracket is coupled to the at least one retaining assembly via a fastening device, wherein the fastening device is configured to allow rotation of the at least one bracket.

6. The mounting assembly of claim 1, wherein the at least one protrusion is adapted to generate an audible indicator in response to the at least one recess being engaged.

7. The mounting assembly of claim 1, further comprising a spring-loaded retention mechanism configured to exert at least one force adapted to cause the at least one protrusion to engage the at least one recess.

8. The mounting assembly of claim 7, wherein the spring-loaded retention mechanism comprises at least one of:

a compression spring configured to apply the at least one force to the at least one retaining assembly in the direction of the latching edge; or an expansion spring configured to apply the at least one force to the latching edge in the direction of the at least one retaining assembly.

9. The mounting assembly of claim 7, wherein the at least one protrusion comprises at least one pin, wherein the spring-loaded retention mechanism is disposed in the at least one retaining assembly and the spring-loaded retention mechanism comprises:

at least one chamber;

the at least one pin disposed in the at least one chamber adjacent to the latching edge; and at least one compression spring disposed in the at least one chamber adjacent to the at least one pin.

10. A mounting assembly for mounting a device for rotation in a lateral direction and a longitudinal direction with respect to a surface, the mounting assembly comprising:

at least one first bracket movably positionable at each of a plurality of lateral orientation angles with respect to the surface and comprising a first latching edge defining a first plurality of recesses, each of the first plurality of recesses corresponding to a respective one of the plurality of lateral orientation angles;

at least one first retaining assembly positionable adjacent to the at least one first bracket, the at least one first retaining assembly comprising at least one first protrusion adapted to engage at least one first recess of the first plurality of recesses to form a first latching connection between the at least one first bracket and the at least one first retaining assembly, wherein the first latching connection is configured to retain the at least one first bracket at a respective one of the plurality of lateral orientation angles corresponding to the at least one first recess;

at least one second bracket coupled to the first bracket and movably positionable at each of a plurality of longitudinal orientation angles with respect to the surface and comprising a second latching edge defining a second plurality of recesses, each of the second plurality of recesses corresponding to a respective one of the plurality of longitudinal orientation angles; and at least one second retaining assembly positionable adjacent to the at least one second bracket, the at least one second retaining assembly comprising at least one second protrusion adapted to engage at least one second recess of the second plurality of recesses to form a second latching connection between the at least one second bracket and the at least one second retaining assembly, wherein the second latching connection is configured to retain the at least one second bracket at a respective one of the plurality of longitudinal orientation angles corresponding to the at least one second recess;

wherein at least one of the first latching edge or the second latching edge is formed from a semi-rigid material, the semi-rigid material adapted to bend away from a respective retaining assembly in response to a force applied by a respective protrusion to a portion of the respective latching edge between two recesses and further adapted to bend toward the respective retaining assembly in response to a cessation of the at least one force.

11. The mounting assembly of claim 10, further comprising a mounting mechanism configured for coupling the mounting assembly to at least one of a structure or a fixed object.

12. The mounting assembly of claim 10, wherein the device comprises an antenna unit.

13. The mounting assembly of claim 10, wherein at least one of the at least one first bracket or the at least one second bracket is respectively coupled to the at least one first retaining assembly or the at least one second retaining assembly via a fastening device, wherein the fastening device is configured to allow rotation of the respective bracket.

14. The mounting assembly of claim 10, wherein at least one of the at least one first protrusion and the at least one second protrusion is adapted to generate an audible indicator in response to the respective recess being engaged.

15. The mounting assembly of claim 10, wherein at least one of the at least one first retaining assembly and the at least one second retaining assembly further comprises at least one spring-loaded retention mechanism configured to exert at least one force adapted to cause a respective protrusion to engage a respective recess.

16. The mounting assembly of claim 15, wherein the at least one spring-loaded retention mechanism comprises at least one of:

a compression spring configured to apply the at least one force to a respective retaining assembly in the direction of a respective latching edge; or an expansion spring configured to apply the at least one force to the respective latching edge in the direction of the respective retaining assembly.

17. The mounting assembly of claim 15, wherein at least one of the at least one first protrusion and the at least one second protrusion comprises at least one pin, wherein the at least one spring-loaded retention mechanism is disposed in a respective retaining assembly, the at least one spring-loaded retention mechanism comprising:

at least one chamber;

the at least one pin disposed in the at least one chamber adjacent to the respective latching edge; and at least one compression spring disposed in the at least one chamber adjacent to the at least one pin.

* * * * *